United States Patent [19]

Moore

[11] Patent Number: 5,071,018
[45] Date of Patent: Dec. 10, 1991

[54] CAPLESS CLOSURE ASSEMBLY FOR A FUEL FILLER PIPE

[75] Inventor: Donald E. Moore, Brighton, Mich.

[73] Assignee: Ford Motor Company, Dearborn, Mich.

[21] Appl. No.: 580,025

[22] Filed: Sep. 10, 1990

[51] Int. Cl.5 .............................................. B65D 90/24
[52] U.S. Cl. .................................................... 220/86.2
[58] Field of Search ................... 220/86.1, 86.2, 85 F, 220/85 S, 203, 367, 913, DIG. 32, DIG. 33

[56] References Cited

U.S. PATENT DOCUMENTS

| | | | |
|---|---|---|---|
| 2,294,190 | 8/1942 | Lee | 220/210 X |
| 2,663,447 | 12/1953 | Westcott | 220/335 |
| 3,374,007 | 3/1968 | Ingolia | 280/847 |
| 3,730,216 | 5/1973 | Arnett et al. | 137/588 |
| 3,911,977 | 10/1975 | Berger | 141/348 |
| 4,762,247 | 8/1988 | Temmesfeld | 220/303 |
| 4,795,050 | 1/1989 | Smith et al. | 220/86.2 X |
| 4,817,813 | 4/1989 | Krause | 220/86 R |
| 4,932,444 | 6/1990 | Micek | 220/86.2 X |
| 4,944,779 | 7/1990 | Szlaga et al. | 220/86.2 X |
| 4,946,060 | 8/1990 | Sherwood et al. | 220/86.2 |
| 4,955,950 | 9/1990 | Seiichi et al. | 220/86.2 X |

Primary Examiner—Steven M. Pollard
Attorney, Agent, or Firm—Lorraine S. Melotik; Daniel M. Stock; Roger L. May

[57] ABSTRACT

This invention is directed to a capless closure assembly positionable within the inlet of a container for a liquid, more particularly within the filler pipe of a fuel tank. The assembly comprises a housing defining a fuel flow passage and a vapor bypass passage, a vapor pressure responsive valve means and a pivotable flap member for closing off the fuel flow passage.

3 Claims, 2 Drawing Sheets

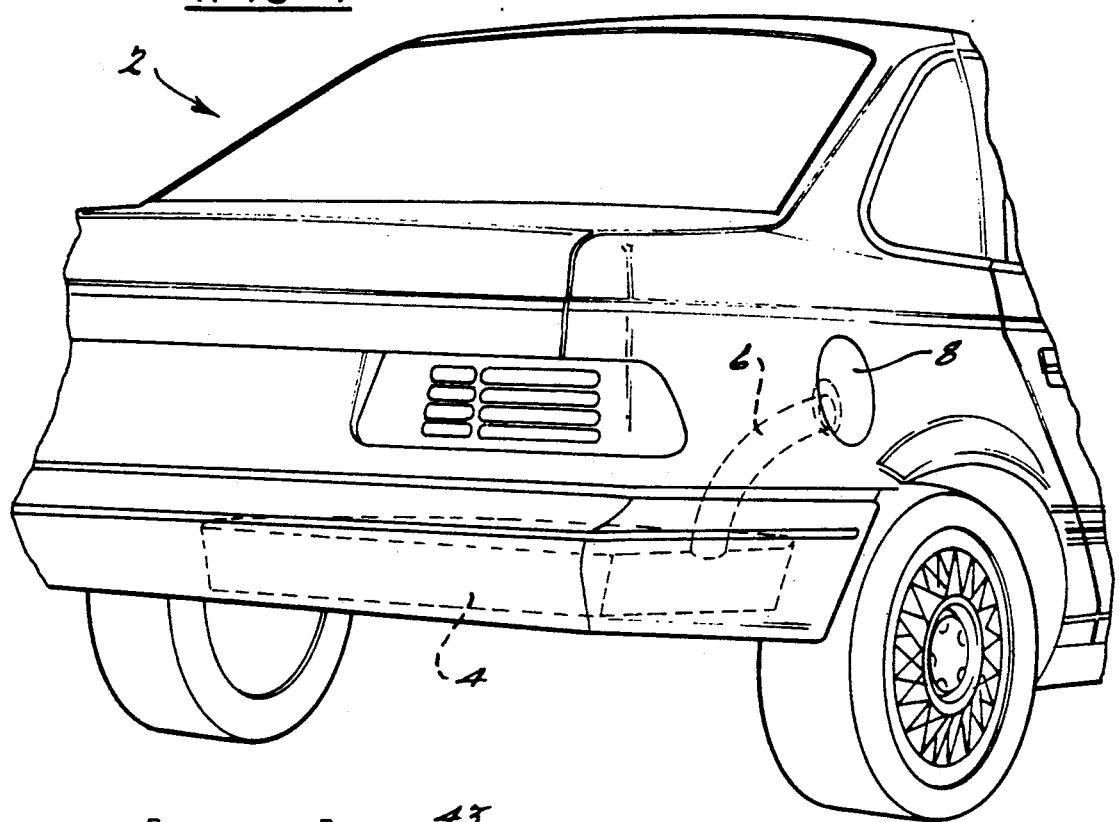
FIG-1
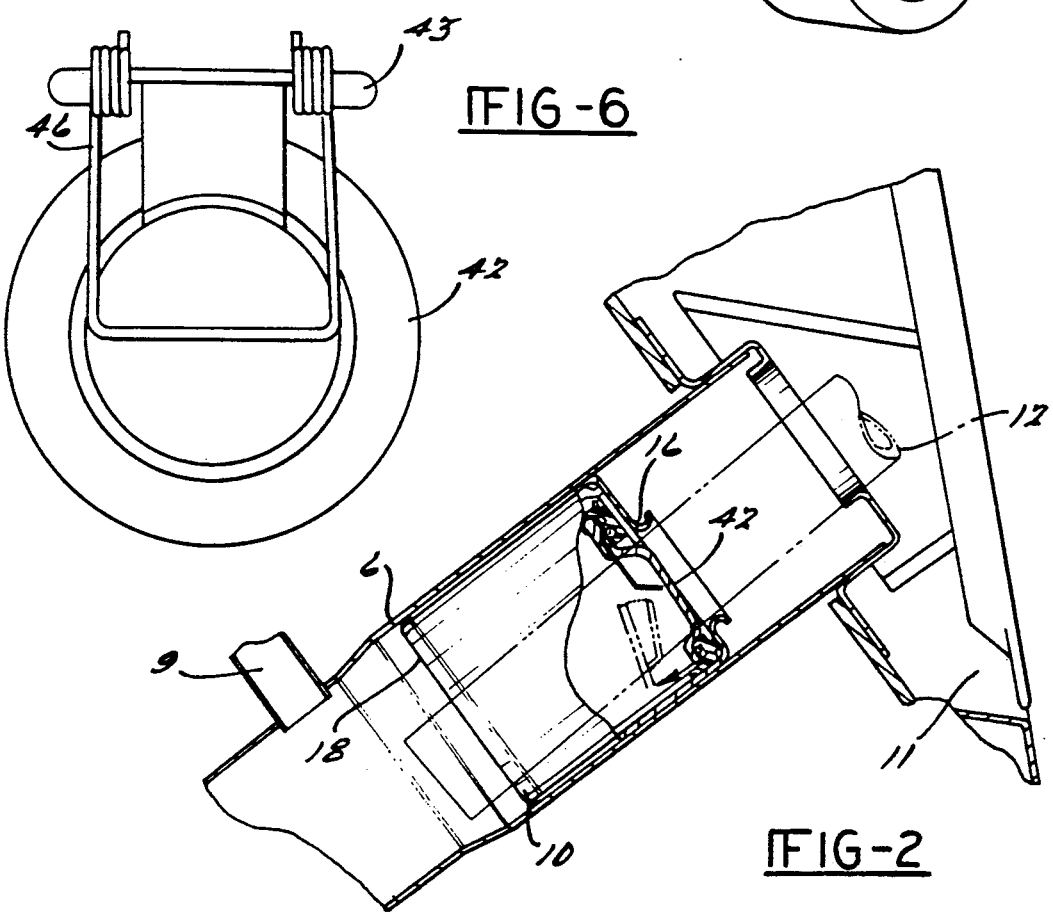
FIG-6
FIG-2

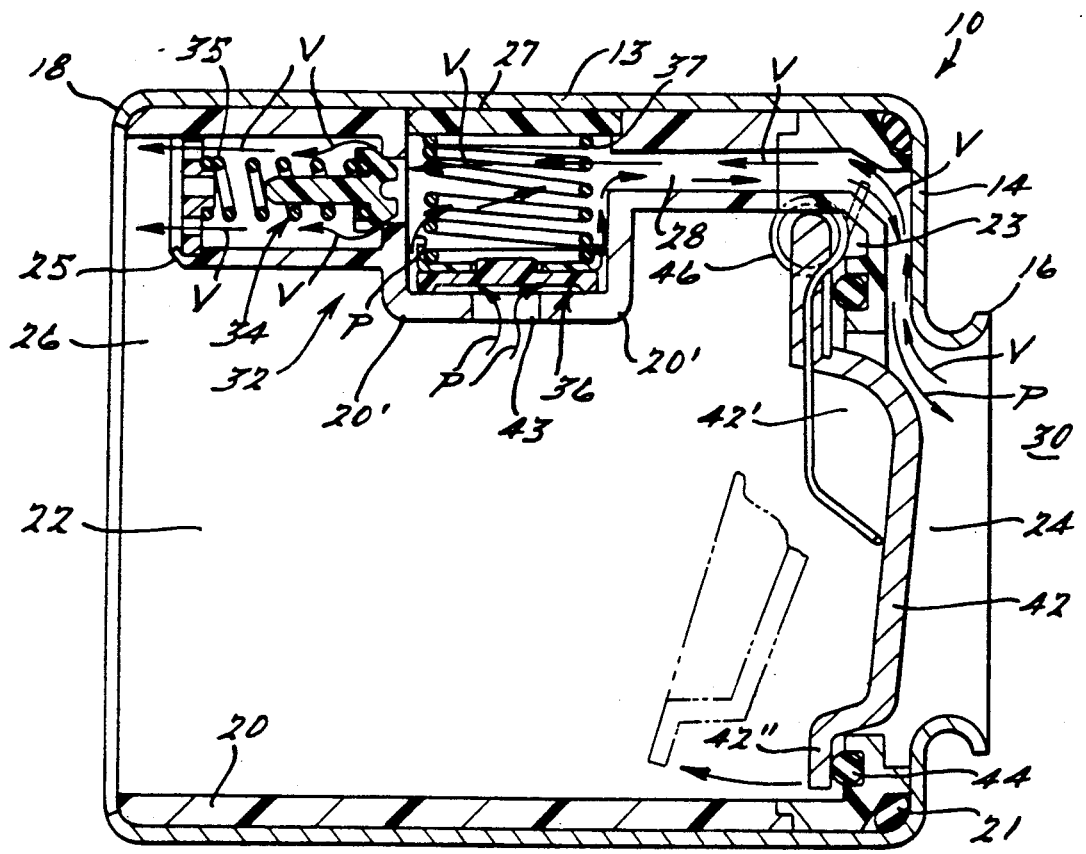
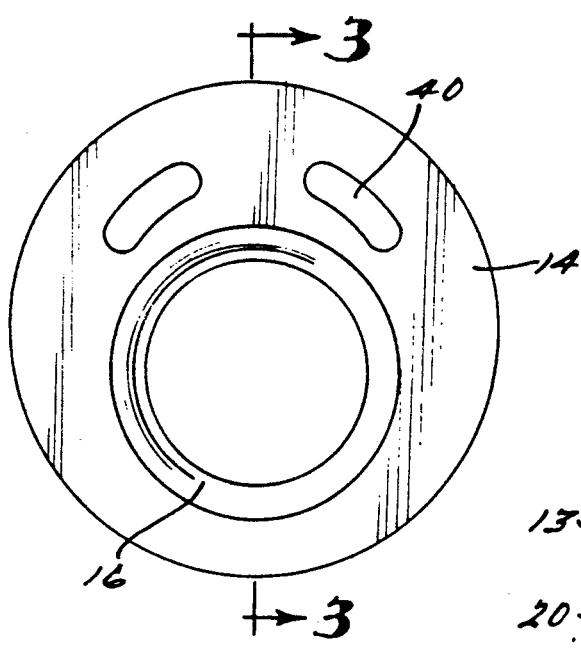
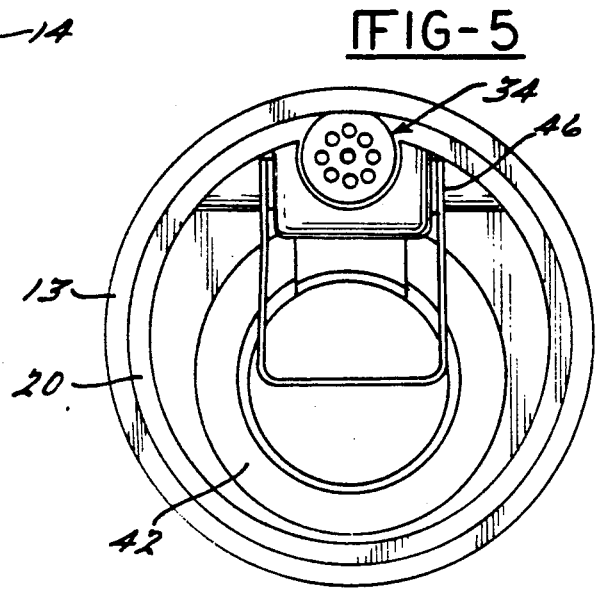

CAPLESS CLOSURE ASSEMBLY FOR A FUEL FILLER PIPE

BACKGROUND OF THE INVENTION

The present invention relates to a capless closure assembly for an inlet for a container for holding a liquid, and more particularly to a capless closure assembly which can be positioned within a fuel filler pipe for a fuel tank.

DISCUSSION OF RELATED ART

A separate cap that is releasably secured onto the end of the filler pipe of a gas tank is the conventional means of closing the filler pipe. Such caps are subject to loss or damage. To avoid the latter, the cap may be tethered to the pipe by some flexible material. To insert the nozzle into the filler pipe, it is necessary to unscrew the cap and hold it out of the way until the nozzle has been inserted. Often the first is difficult and the second is clumsy. Replacing the cap after filling the tank can be equally inconvenient.

To alleviate problems associated with the use of the separate cap, capless closure means for sealing off the filler pipe have been suggested. U.S. Pat. No. 2,294,190 to Lee discloses a spring moveable valve plate which slides across the top of the filler pipe, operative to close and open the filler pipe. U.S. Pat. No. 2,663,447 to Westcott discloses a pivotable plate carrying a spring-mounted disc which in its closed position presses against the neck of the filler pipe to close the filler pipe opening. U.S. Pat. No. 3,374,007 to Ingolia discloses an arrangement including two covers which are simultaneously operable, one cover being a sealing closure and the other serving as a trough support for a gas pump nozzle during tank filing. U.S. Pat. No. 4,817,813 to Krouse discloses a closure device undetachably seated on the filler pipe and provided with a through-opening corresponding to the pipe opening. The closure device can rotate to allow alignment of the through-opening with the pipe opening for filling a fuel tank.

U.S. Pat. No. 3,730,216 to Arnett et al. discloses a funnel shaped fuel tank insert having a gate which remains closed unless a non-leaded fuel nozzle is inserted which releases a latch for the gate. If fuel is delivered by a larger leaded fuel nozzle, the gate remains closed and fuel backs up in the nozzle which causes the automatic shut-off device in the nozzle to terminate flow of the leaded fuel. U.S. Pat. No. 3,911,977 to Berger also discloses a structure designed to shut off fuel flow delivered from a non-regulation fuel nozzle. These structures, however, do not have a fluid tight seal and hence would be expected to be used with additional closure means. Additionally, none of these structures include a valve means within the structure for regulating the vapor pressure within the tank. Currently employed separate caps generally contain a pressure/vacuum valve for regulating the pressure.

U.S. Pat. No. 4,762,247 to Tennesfeld discloses an orifice ring for fixing to a self-sealing fuel tank cap. According to the patent, the orifice ring serves to deflect vapors leaving the filler pipe during filling of the tank away from the person filling the tank. The fuel tank cap comprises a flap which closes the neck of the fuel tank. The cap does not include a valve means for maintaining the vapor pressure within the fuel tank within chosen limits as in the present invention.

In spite of the fact that the use of the conventional, separate caps have the disadvantages mentioned above and capless closure means have been proposed, separate fuel caps are still essentially exclusively used in the automotive industry.

It is an object of the present invention is to provide a commercially desirable capless closure assembly which duplicated the function of separate fuel caps without requiring the removal of a fuel cap.

It is a further object of the invention to provide a closure assembly which is opened by simply engaging a fuel nozzle against a pivotable flap member within the assembly.

It is a yet another object of this invention that the assembly in its closed position provides a fluid tight seal to the fuel tank.

It is still another object of this invention that the assembly maintains the vapor pressure within the assembly, and hence the fuel tank, in a desirable range at all times so as to avoid undesireable underpressure (vacuum) and overpressure situations.

SUMMARY OF THE INVENTION

The closure assembly of the present invention provides a housing member receivable within the inlet to the container. Two passages are defined within the housing: (a) a liquid flow passage having an opening at one end for receiving a liquid and (b) a vapor bypass passage parallel to the liquid flow passage for providing vapor communication between the liquid flow passage and the ambient outside the housing member. The closure assembly also includes a flap member carried by the housing and pivotable between closed and open positions operative in its closed position to close off the opening of the liquid flow passage. A vapor pressure responsive valve means is mounted in a portion of the housing member of the assembly. This valve means provides vapor communication between the liquid flow passage and the vapor vapor bypass passage and is operative to maintain the vapor pressure within the liquid flow passage within a prescribed range when the flap member is in its closed position.

The closure assembly may additionally comprise a seal means for effecting a fluid tight seal between the housing and the flap member when the flap member is in its closed position. The closure assembly further may comprise a resilient means which biases the flap member toward the closed position and allows the flap member to pivot to its open position when pressure is applied against the flap member by a liquid dispensing nozzle.

According to another aspect of the invention, it is directed to an assembly of the type disclosed above positionable within the filler pipe for a fuel tank. According to this aspect, the assembly comprises a substantially cylindrical outer housing member terminating at one end in a transverse wall with a flanged opening which can accept a suitable fuel dispensing nozzle. The other end of the outer housing is open to the fuel tank. The assembly also comprises an inner housing member seated within the outer housing member which defines two passages: (a) a fuel flow passage between an inlet and an outlet for conducting fuel from the inlet to the outlet, the inlet being aligned near the flanged opening, and (b) a vapor bypass passage parallel to the fuel flow passage which provides vapor communication between the fuel flow passage and the ambient outside the transverse wall. The assembly further comprises the vapor pressure responsive valve means and the flap member disclosed above. It may further comprise the seal means and the resilient means for biasing the flap member disclosed above.

BRIEF DESCRIPTION OF THE DRAWINGS

Other objects and features will become apparent to those skilled in the filler pipe closure arts upon reading the following description with reference to the drawings in which:

FIG. 1 is a perspective view of a rear portion of an automobile having a fuel tank and a filler pipe for the tank.

FIG. 2 is a partial cross-sectional view of an embodiment of the closure assembly according to the present invention positioned within the filler pipe shown in FIG. 1.

FIG. 3 is an enlarged cross-sectional view of the closure assembly of FIG. 2 further detailing a vapor pressure responsive means according to an embodiment of the present invention.

FIG. 4 is a perspective view of the assembly of FIG. 3 viewed along line 3—3 of FIG. 4.

FIG. 5 is a perspective view of the assembly of FIG. 3 viewed along line 5—5 of FIG. 3.

FIG. 6 is a perspective view of a flap member according to an embodiment of the present invention.

DESCRIPTION OF THE PREFERRED EMBODIMENT

Turning now to the drawings, the rear portion of an automobile 2 having a fuel tank 4 and a filler pipe 6 for fuel tank 4 is shown in FIG. 1. Access to the filler pipe 6 for fueling tank 4 is through a filler door 8. A closure assembly 10, according to a preferred embodiment of the invention, is illustrated as being contained within filler pipe 6 of fuel tank 4. The filler pipe 6 is attached at its upper end to fuel filler housing 11. A fuel dispensing nozzle 12 is shown in phantom in FIG. 2 positioned as it would be during fueling of the automobile. A vent port 9, not part of the present invention, is generally employed connected by means of tubing to tank 4. Such an arrangement allows air from the fuel tank to vent to the ambient by means of filler pipe 6 (through assembly 10) as the tank is being fueled.

With reference particularly to FIG. 3, the closure assembly 10 is illustrated as including a substantially cylindrical outer housing member 13. This outer housing is received and fixedly secured within filler pipe 6 as by press fit, adhesive or frictional welding (for assemblies having plastic outer housing members) or like processs. The outer housing member 13 terminates at one end in a transverse wall 14 having a flanged opening 16 to accept a fuel dispensing nozzle 12 (see FIG. 2) of suitable size, e.g., a nozzle dispensing non-leaded fuel. The other end 18 of the outer housing member is open to the downstream end of filler pipe 6 and hence to the fuel tank 4.

In the embodiment of the present invention illustrated in FIG. 3, an inner housing member 20 is seated securely within outer housing member 13. The non-flanged end 18 of the outer housing member 13 may be crimped against the end of inner housing member 20 to further make the assembly housing members substantially unitary. To further the seal between the outer housing member and the inner housing member an additional seal such as O-ring 21 may be employed. Inner housing member 20 defines two passages, one of which is fuel flow passage 22 between inlet 24 and outlet 26 for conducting fuel from the inlet to the outlet, i.e., for filling the fuel tank. Inlet 24 of the inner housing member 20 is aligned near flanged opening 16 of the outer housing member 13. As can be seen from the figures, the flanged opening 16 need not be located in the center of the transverse wall. Preferably, flanged opening 16 and, correspondingly, the inlet 24 is offset nearer to one side of the outer housing member 13, which in this embodiment is cylindrical. The assembly 10 would be positioned within the filler pipe as shown in FIG. 2.

A flap member 42, as shown in greater detail in FIG. 6 has a T-portion at the top comprising two pin portions 43 about which the flap member is pivotable between open and closed positions. As shown in FIG. 3, the flap member 42 in its closed position is able to close off inlet 24 of fuel flow passage 22. The flap member is biased toward its closed position by a resilient means such as the spring 46 illustrated in FIG. 3. As shown in greater detail in FIG. 5, spring 46 is preferably squared in shape. The ends of spring 46 are affixed about pin portions 43 of flap member 42. When fuel dispensing nozzle 12 is engaged against flap member 42, the flap member pivots open to allow fuel to be dispensed into the fuel tank through the fuel flow passage of the assembly as shown in FIGS. 2 and 3. The flap member is shown in a partially open position in broken lines in FIG. 3. The flap member pin portions 43 and the end of spring 46 are positioned within a cavity in a portion 23 of inner housing member 20 to secure them within assembly 10.

The other passage defined by inner housing member 20 is vapor bypass passage 28 which is parallel to fuel flow passage 22. Vapor bypass passage 28 provides vapor communication between fuel flow passage 22 and the ambient 30 outside the transverse wall 14. A vapor pressure responsive valve means 32 mounted in the inner housing member 20 provides vapor communication between the fuel flow passage 22 and the vapor bypass passage 28. The vapor pressure responsive valve means 32 is operative to maintain the vapor pressure within the fuel tank within a prescribed range when the flap member 42 is in its closed position. As illustrated in FIG. 3 according to a preferred embodiment, the vapor pressure responsive valve means comprises a vacuum relief valve 34 and a pressure relief valve 36. These valves are spring loaded relief valves housed in a portion of the inner housing member 20' which protrudes perpendicular to the axis of assembly 10. The valves comprise coil springs 35 (of the vacuum relief valve 34) and 37 (of the pressure relief valve 36). A difference in pressure across the valve members opens communication between fuel flow passage 22 and vapor bypass passage 28 because of the force balance opposing the spring loads. The inner housing member 20 is split into an inner and outer portion. The valves are conveniently assembled into the inner portion of the inner housing member 20, the vacuum relief valve being contained within the housing member by tab 25 and the pressure relief valve by plug 27. This inner portion is positioned into the outer housing member 13 containing a preassembled outer portion of the inner housing member 20 containing the spring and flap member as well as seals 21 and 44.

Ambient air is caused to enter assembly 10 when it is necessary to increase the vapor pressure within the fuel tank to be within a desired pressure range. This increase to the vapor pressure is brought about by means of the vacuum relief valve 34. Ambient air entering the assembly is shown in FIG. 3 by arrows marked "v". On the other hand, when the vapor pressure within the tank exceeds that desired, the pressure will be reduced to that desired by means of the pressure relief valve 36. To reduce the vapor pressure within the tank when necessary, vapor will pass through the assembly and out to the ambient as shown in FIG. 3 by arrows marked "p". The vapor responsive valve means 32 keeps the vapor pressure within the fuel tank and hence the assembly within the desired range and avoids any problems which might arise if too great a negative (vacuum) or positive pressure were to exist within the tank.

At all times, e.g., when flap member 42 is in its closed position or when the tank is being fueled, vapors from the tank are allowed by means of the vapor bypass passage 28 to exit to the ambient and also air from the ambient is allowed to enter the tank. Air from the ambient may enter vapor bypass passage 28 and vapors from the fuel flow passage may exit vapor bypass passage 28 by means of an opening 38 between the inner and outer housing members (around the flanged opening) or through apertures 40 shown in FIG. 4. FIG. 4 is a view of the transverse wall 14 of the outer housing member 13 as viewed perpendicular thereto from outside assembly 10. Apertures, according to this embodiment, provide additional exits for the vapors. When the tank is being fueled, vapors from within the tank may exit around the filler nozzle 12 and out past flanged opening 16 or through apertures 40.

Advantageously, the flap member 42 would be of a configuration that can pivot to a wide open position during fueling. For example, in an assembly like that of FIG. 3, flap member 42 would be configured to receive the housing portion surrounding vapor pressure responsive valve means 32 in nested relationship when the flap member 42 is in its open position. In this case, flap member 42 has a depression 42' which is sized to correspond to the inner housing portion 20' enclosing pressure relief valve member 36 and vacuum relief valve 34. Additionally, such a configuration allows opening 43 to pressure relief valve means 36 to be somewhat closed off from the fuel flow passage during filling of the fuel tank, so as to inhibit fuel from flowing into valve opening 43. Flap member 42 also includes a axially recessed flat annular portion 42" at the end of the flap member. A seal member 44 such as an O-ring is positioned in an annular grove in the inner housing member 20. Axially recessed flat annular portion 42" of flap member 42, when it is in its closed position, engages and compresses seal member 44 to effect a fluid tight seal between flap member 42 and inner housing 20. The incorporation of the axially recessed flat annular portion 42" in the design of flap member 42 prevents the edge of flap member 42 from comming in contact with the fuel dispensing nozzle during fueling so as to prevent wear at the edge of the flap member. This assures that the flap member 42 will continue to provide a fluid tight seal in its closed position.

The preferred embodiments of this invention have been illustrated and described above. Modifications and additional embodiments, however, will undoubtedly be apparent to those skilled in the art. In some applications, for example, the inner housing and the outer housing comprise a unitary housing, e.g., a molded unitary plastic housing. Furthermore, equivalent elements may be substituted for those illustrated and described herein, parts or connections might be reversed or otherwise interchanged, and certain features or the invention may be utilized independently of other features. Consequently, the exemplary embodiments should be considered illustrative, rather than inclusive, while the appended claims are more indicative of the full scope of the invention.

I claim:

1. A closure assembly for a fuel filler pipe, comprising:
   a substantially cylindrical outer housing member completely received within said pipe terminating at one end in a transverse wall with a flanged opening adapted to accept a suitable fuel dispensing nozzle and the other end being open to said fuel tank;
   an inner housing member seated within said outer housing which defines two passages: (a) a fuel flow passage between an inlet and an outlet for conducting fuel from said inlet to said outlet, said inlet being aligned near said flanged opening, and (b) a vapor bypass passage parallel to said fuel flow passage providing vapor communication between said fuel flow passage and the ambient outside said transverse wall;
   a vapor pressure responsive valve means mounted in a portion of said inner housing member and providing vapor communication between said fuel flow passage and said vapor bypass passage and operative to maintain the vapor pressure within said fuel tank within a prescribed range, said vapor pressure responsive valve means comprises a vacuum relief valve and a pressure relief valve;
   a flap member carried by said inner housing and pivotable between closed and open positions operative in its closed position to close off said inlet of said fuel flow passage, a resilient means biasing said flap member toward said closed position and allowing said flap member to pivot to its open position when said fuel dispensing nozzle is engaged against said flap member; and a seal means for effecting a fluid tight seal between said flap member and said inner housing member when said flap member is in its closed position.

2. The closure assembly according to claim 1, wherein said flap member comprises an axially recessed flat annular portion at the outer periphery of said flap member.

3. The closure assembly according to claim 1, wherein said flap member is configured to receive said housing portion in nested relationship when said flap is in said open position.

* * * * *